United States Patent
Nagase et al.

(10) Patent No.: US 12,323,329 B2
(45) Date of Patent: Jun. 3, 2025

(54) CONGESTION CONTROL METHOD, CONGESTION CONTROL DEVICE, AND CONGESTION CONTROL PROGRAM

(71) Applicant: Nippon Telegraph and Telephone Corporation, Tokyo (JP)

(72) Inventors: Fumiaki Nagase, Musashino (JP); Yu Ono, Musashino (JP); Keita Kuriyama, Musashino (JP); Masafumi Yoshioka, Musashino (JP); Toshifumi Miyagi, Musashino (JP); Hitoshi Hasegawa, Musashino (JP); Kazuo Osaka, Musashino (JP); Hayato Fukuzono, Musashino (JP); Hiroyuki Furuya, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 218 days.

(21) Appl. No.: 18/030,687

(22) PCT Filed: Oct. 8, 2020

(86) PCT No.: PCT/JP2020/038174
§ 371 (c)(1),
(2) Date: Apr. 6, 2023

(87) PCT Pub. No.: WO2022/074795
PCT Pub. Date: Apr. 14, 2022

(65) Prior Publication Data
US 2023/0370380 A1    Nov. 16, 2023

(51) Int. Cl.
*H04L 47/11* (2022.01)
*H04L 47/32* (2022.01)
(Continued)

(52) U.S. Cl.
CPC .............. *H04L 47/11* (2013.01); *H04L 47/32* (2013.01); *H04M 7/006* (2013.01); *H04W 28/0289* (2013.01)

(58) Field of Classification Search
CPC ........ H04L 47/11; H04L 47/32; H04M 7/006; H04W 28/0289
See application file for complete search history.

(56) References Cited

U.S. PATENT DOCUMENTS 6,678,258 B1 *  1/2004  Capurka ............. H04W 84/025
                                                          370/328
10,469,661 B1 * 11/2019  Xuereb ............... H04M 3/5158

FOREIGN PATENT DOCUMENTS

| JP | 2008160712 | 7/2008 |
| JP | 2008219280 | 9/2008 |
| JP | 2014209701 | 11/2014 |

OTHER PUBLICATIONS

Nagase et al., "A Study on Congestion Control Scheme for Emergency Communication with Fixed Wireless Link," 2020 IEICE Communications Society Conference, Sep. 15, 2020, 3 pages (with English Translation).

* cited by examiner

*Primary Examiner* — Kibrom T Hailu
(74) *Attorney, Agent, or Firm* — Fish & Richardson P.C.

(57) ABSTRACT

A congestion control method in an IP telephone system includes acquiring a number of simultaneous calls in one line shared by a plurality of IP telephones, acquiring a call time order corresponding to length of a call time for each call, and controlling a packet discard rate of each call on the basis of the number of simultaneous calls and the call time order. The packet discard rate of each call is set to a predetermined first upper limit value or less. In addition, the packet discard rate is set higher as the call time is longer, and (Continued)

the packet discard rate is set lower as the call time is shorter. Further, the packet discard rate of the latest call having the shortest call time is set to be equal to or less than a predetermined second upper limit value lower than the predetermined first upper limit value.

7 Claims, 17 Drawing Sheets

(51) Int. Cl.
*H04M 7/00* (2006.01)
*H04W 28/02* (2009.01)

Fig. 4

⟨ PACKET DISCARD RATE IN CASE OF COMPARATIVE EXAMPLE ⟩

| NUMBER OF SIMUTANEOUS CALLS (j) / CALL TIME ORDER (k) | 1 | 2 | 3 | 4 | 5 | 6 UNITS (%) |
|---|---|---|---|---|---|---|
| 1 (LONG) | 0 | 0 | 0 | 30 | 50 | 50 |
| 2 | | 0 | 0 | 20 | 41 | 47.3 |
| 3 | | | 0 | 10 | 32 | 44.7 |
| 4 | | | | 0 | 23 | 42 |
| 5 | | | | | 14 | 39.7 |
| 6 (SHORT) | | | | | | 36.7 |

CALL TIME

Fig. 11

<PACKET DISCARD RATE IN CASE OF COMPARATIVE EXAMPLE>

| NUMBER OF SIMULTANEOUS CALLS (j) / CALL TIME ORDER (k) | 1 | 2 | 3 | 4 | 5 | 6 UNITS (%) |
|---|---|---|---|---|---|---|
| 1 (LONG) | 0 | 0 | 0 | 30 | 47.851 | 49.810 |
| 2 | | 0 | 0 | 20 | 45.280 | 49.496 |
| 3 | | | 0 | 10 | 39.634 | 48.683 |
| 4 | | | | 0 | 27.234 | 46.451 |
| 5 | | | | | 0 | 40.580 |
| 6 (SHORT) | | | | | | 25.0 |

CALL TIME

Fig. 16

<200: CALL MANAGEMENT TABLE>

| CALL ID | TRANSMISSION SOURCE ADDRESS/ PORT NUMBER | DESTINATION ADDRESS/ PORT NUMBER | CALL START TIME |
|---|---|---|---|
| C1 | GA.GB.GC.GD/1000 | TA.TB.TC.TD/5000 | YY/DD/HH:MM:SS |
| C2 | GE.GF.GG.GH/1200 | TE.TF.TG.TH/5200 | YY/DD/HH:MM:SS |
| C3 | GI.GJ.GK.GL/1400 | TI.TJ.TK.TL/5400 | YY/DD/HH:MM:SS |
| ... | ... | ... | ... |

CONGESTION CONTROL METHOD, CONGESTION CONTROL DEVICE, AND CONGESTION CONTROL PROGRAM

CROSS-REFERENCE TO RELATED APPLICATIONS

This application is a National Stage application under 35 U.S.C. § 371 of International Application No. PCT/JP2020/038174, having an International Filing Date of Oct. 8, 2020, the disclosure of which is considered part of the disclosure of this application, and is incorporated by reference in its entirety into this application.

TECHNICAL FIELD

The present invention relates to a technique for controlling congestion in an IP (Internet Protocol) telephone system.

BACKGROUND ART

For recent frequent disasters, it is useful that a plurality of users use a wireless channel in which the channel is shared in band to secure communication in an evacuation site or the like. In addition, with the spread of call applications by smart phones, use demands for not only daily call means but also emergency contact means have become high. Since the call application performs real-time communication, packet communication by UDP/IP (User Datagram Protocol/Internet Protocol) is performed. Since retransmission control is not performed in the UDP/IP, when a call traffic equal to or more than a capacity of the wireless channel occurs, packets exceeding the capacity are discarded (PTL 1).

In a case of emergency, it is important to accommodate as many calls as possible (PTL 2). However, in the emergency such as the disaster, there is a tendency that the call time per person is long and the number of users is increased. Thus, the total communication amount of the call application exceeds the capacity of the wireless channel, and the packet discard rate becomes high, and the call quality is deteriorated (PTL 3). As a result, a call newly originated is not started, a call loss rate is increased, and the number of call accommodation cannot be increased.

NPL 1 discloses a congestion control technique for suppressing an increase in the call loss rate. According to the congestion control technique, when the total communication amount of the call application exceeds the line capacity, priority is set on the basis of the call time length, and the packet discard rate is set according to the priority. More specifically, the shorter the call time, the higher the priority, and the lower the packet discard rate. On the other hand, the longer the call time, the lower the priority level and the higher the packet discard rate. When the packet discard rate is increased and the call quality is deteriorated, it is expected that such a situation encourages a user to end the call. Namely, the longer the call time, the more likely it is that the user ends the call. Ending long calls will free up the line resources and improves the call quality of other users' calls. Another advantage of the congestion control is that the call loss rate will decrease because new calls from users are more likely to be accepted.

In NPL 1, the upper limit value of the packet discard rate is set so that the call quality is not remarkably deteriorated. The maximum value of the number of simultaneous calls (the maximum number of simultaneous calls) is set so that the packet discard rate does not exceed the upper limit value. For the call newly generated exceeding the maximum number of simultaneous calls, all packets are discarded to substantially make a call loss.

CITATION LIST

Patent Literature

[PTL 1] Japanese Patent Application Publication No. 2008-160712
[PTL 2] Japanese Patent Application Publication No. 2008-219280
[PTL 3] Japanese Patent Application Publication No. 2014-20970.

Non Patent Literature

[NPL 1] Nagase, Ono, Ito, Yoshioka, Osaka, Furuya, Miyagi, Hayashi, "A study on congestion control technique in emergency communication by using fixed wireless line", The Institute of Electronics, Information and Communication Engineers society conference of 2020, B-5-82, Sep. 1, 2020

SUMMARY OF INVENTION

Technical Problem

Packets exceeding the line capacity of one line shared by a plurality of IP telephones are discarded. When packets of all the calls using the line are uniformly (equally) discarded, the call quality of all the calls is uniformly deteriorated. This leads to a lower level of satisfaction of all the users, and it is hard to say that this is the most appropriate congestion control.

For example, at the time of the disaster, it is imaginable that a large number of users will just want to confirm each other's safety. When the call time is long, there is a high possibility that necessary information has already been transmitted, but when the call time is short, the possibility is low. Therefore, it is desired to ensure the call quality of the call having the short call time, particularly the "latest call" having the shortest call time as much as possible.

According to the technique described in the above-mentioned NPL 1, especially in a situation where the number of simultaneous calls is maximum, the packet discard rate of the latest call having the shortest call time becomes considerably high. That is, the call quality of the latest speech in which good call quality is most desired is also deteriorated. From such a viewpoint, there is room for improving the congestion control.

One object of the present invention is to provide a congestion control technique capable of suppressing deterioration in call quality of the latest call having the shortest speech call in a situation where the number of simultaneous call is maximum.

Solution to Problem

A first aspect relates to a congestion control method in an IP telephone system.
The congestion control method includes
a processing for acquiring a number of simultaneous calls in one line shared by a plurality of IP telephones,
a processing for acquiring a call time order corresponding to
a length of the call time for each call, and a packet discard control processing for controlling a packet discard rate of each call on the basis of the number of simultaneous calls and the call time order.

In the packet discard control processing, the packet discard rate of each call is set to be equal to or less than a predetermined first upper limit value, the packet discard rate is set to be higher as the call time is longer, and the packet discard rate is set to be lower as the call time is shorter, and the packet discard rate of the latest call having the shortest call time is set to be equal to or less than a predetermined second upper limit value lower than the predetermined first upper limit value.

A second aspect relates to a congestion control program. The congestion control program is executed by a computer, whereby the above congestion control method is implemented by the computer. The congestion control program may be recorded in a computer-readable recording medium. The congestion control program may be provided via a network.

A third aspect relates to a congestion control device in the IP telephone system.

The congestion control device includes an information processing device.

The information processing device is configured to execute a processing for acquiring a number of simultaneous calls in one line shared by a plurality of IP telephones, the processing for acquiring the call time order corresponding to the length of the call time for each call, and the packet discard control processing for controlling the packet discard rate of each call on the basis of the number of simultaneous calls and the call time order.

In the packet discard control processing, the information processing device sets the packet discard rate of each call to be equal to or less than the predetermined first upper limit value, sets the packet discard rate higher as the call time is longer, sets the packet discard rate lower as the call time is shorter, and sets the packet discard rate of the latest call having the shortest call time to be equal to or less than the predetermined second upper limit value lower than the predetermined first upper limit value.

Advantageous Effects of Invention

According to the present invention, the packet discard rate of each call is set to be equal to or less than the predetermined first upper limit value. More particularly, the packet loss rate is set such that the higher the priority ranking, the lower the packet loss rate, and the lower the priority ranking, the higher the packet loss rate. Further, the packet discard rate of the latest call having the shortest call time is set to be equal to or less than the predetermined second upper limit value lower than the predetermined first upper limit value. Therefore, even in a situation where the number of simultaneous calls becomes the maximum number of simultaneous calls, deterioration in the call quality of the latest call can be suppressed.

BRIEF DESCRIPTION OF DRAWINGS

FIG. 4 is a table showing a relationship between a call time order and a packet discard rate in a case of a comparative example.

FIG. 11 is a table showing an example of the relationship between the call time order and the packet discard rate according to the embodiment of the present invention.

FIG. 16 is a conceptual diagram showing an example of a call management table according to the embodiment of the present invention.

DESCRIPTION OF EMBODIMENTS

An embodiment of the present invention is described below with reference to the accompanying drawings.

1. IP Telephone System

Figure 1:
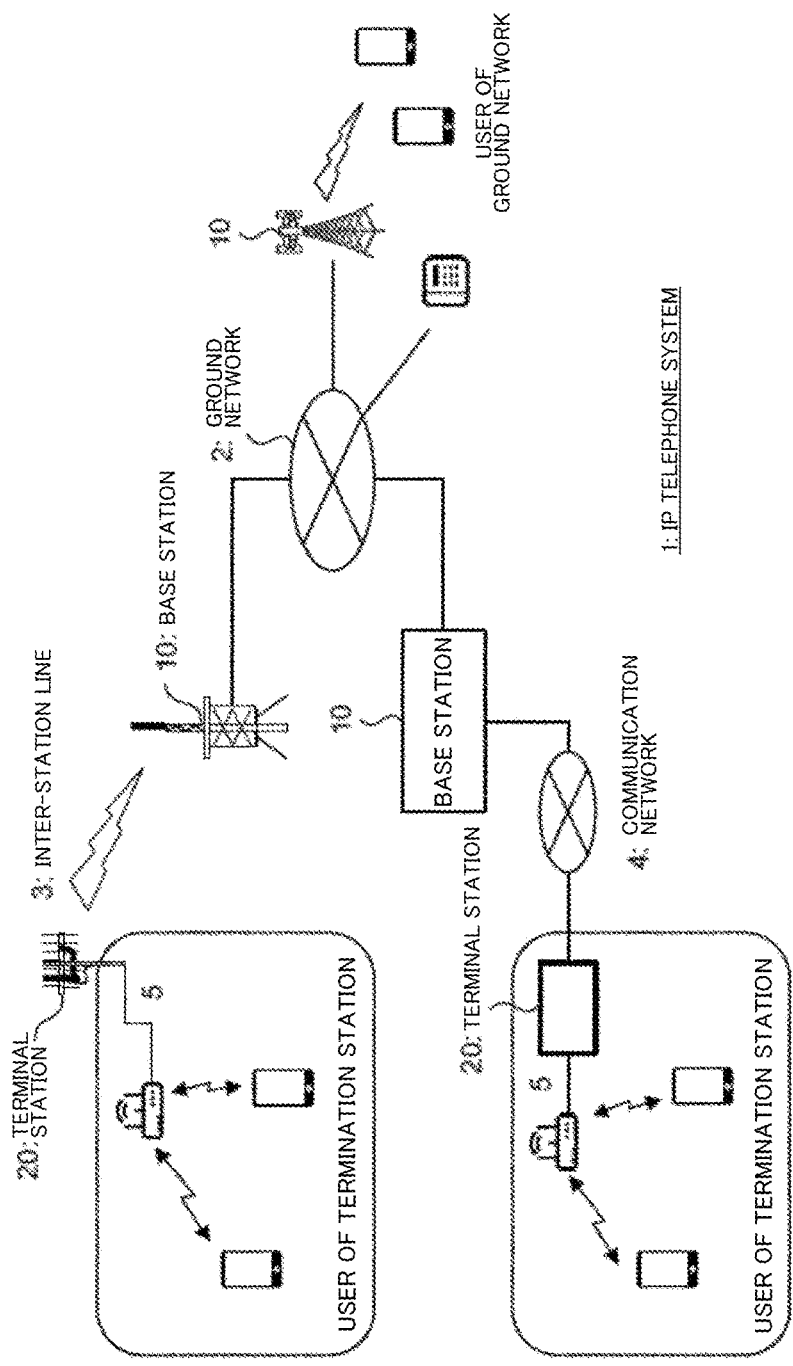
FIG. 1 is a schematic diagram showing a configuration example of an IP telephone system according to an embodiment of the present invention.

FIG. 1 is a schematic diagram showing a configuration example of an IP telephone system 1 according to a present embodiment. The IP telephone system 1 includes a base station 10 and a terminal station 20. The base station 10 is connected to a ground network 2. The terminal station 20 is installed, for example, at a disaster prevention related institution, a life related institution, an evacuation place, or the like. The base station 10 and the terminal station 20 are connected to each other via a wireless inter-station line 3 or a wired communication network 4. The base station 10 and the terminal station 20 communicate with each other via the inter-station line 3 or the communication network 4. The terminal station 20 is connected to a terminal station network 5. In such an IP telephone system 1, for example, a user of the ground network 2 and a user of the terminal station 20 make a call by the IP telephone. One line of the inter-station line 3 or the communication network 4 is shared by a plurality of IP telephone (calls).

IP telephones use UDP/IP (User Datagram Protocol/ Internet Protocol) because real time characteristic is required. Unlike TCP (Transmission Control Protocol), retransmission is not performed in the UDP/IP. Therefore, when a call traffic exceeds a line capacity of the IP telephone line, packets exceeding the line capacity are discarded. For example, in the IP telephone system 1 shown in FIG. 1, when the call traffic exceeds the line capacity of one line of the inter-station line 3 or the communication network 4 between the base station 10 and the terminal station 20, the packets exceeding of the line capacity are discarded.

The IP telephone system 1 according to the present embodiment dynamically controls the packet discard rate of each call in one line. For this purpose, the IP telephone system 1 includes a congestion control device 100. The congestion control device 100 is arranged in association with the station (for example, the base station 10 and the terminal station 20) for controlling the communication amount of the IP telephone.

Figure 2:
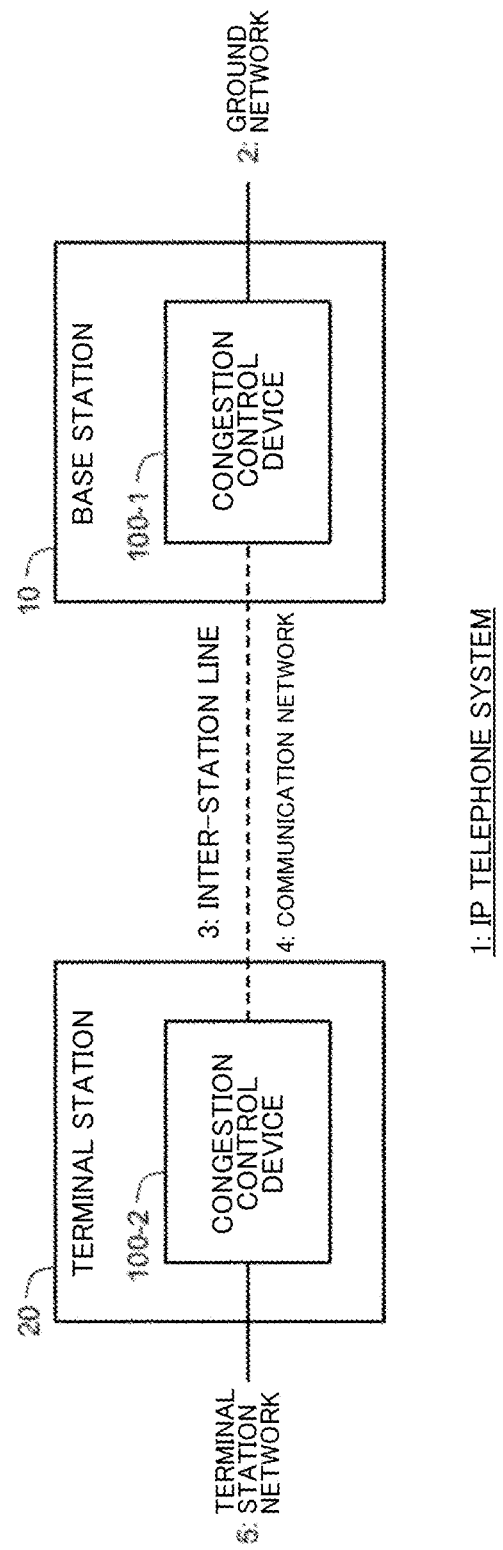
FIG. 2 is a block diagram showing an example of placement of congestion control devices according to the embodiment of the present invention.

FIG. 2 is a block diagram showing an example of an arrangement of the congestion control device 100. In the example shown in FIG. 2, the congestion control device 100-1 is arranged in the base station 10, and the congestion control device 100-2 is arranged in the terminal station 20. Each of the congestion control devices 100-1 and 100-2 controls the packet discard rate in the IP telephone line (the inter-station line 3 or communication network 4) between the base station 10 and the terminal station 20.

Figure 3:
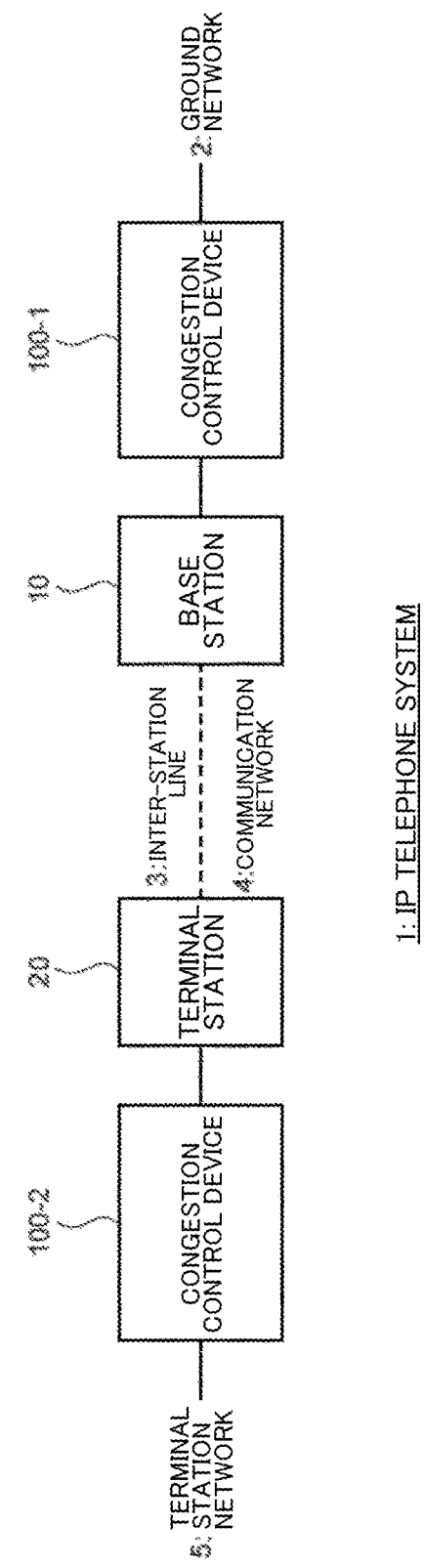
FIG. 3 is a block diagram showing another example of placement of the congestion control devices according to the embodiment of the present invention.

FIG. 3 is a block diagram showing another example of the arrangement of the congestion control device 100. In the example shown in FIG. 3, the congestion control device 100-1 is arranged between the base station 10 and the ground network 2, and the congestion control device 100-2 is arranged between the terminal station 20 and the "user of the terminal station 20". Even in this case, each of the congestion control devices 100-1 and 100-2 can control the packet discard rate in the IP telephone line (the inter-station line 3 or communication network 4) between the base station 10 and the terminal station 20.

The congestion control device 100 according to the present embodiment performs packet discard while appropriately controlling the packet discard rate at the time of congestion. This processing is hereinafter referred to as "packet discard control processing". Hereinafter, "packet discard control processing" by the congestion control device 100 will be described in detail.

2. Comparative Example

In order to clarify the significance of the packet discard control processing according to the present embodiment, a comparative example will be first described. The comparative example is based on the techniques disclosed in the above-mentioned NPL 1.

The number of simultaneous calls j is the number of calls that are using one line at the same time. For example, the number of simultaneous calls j is the number of calls simultaneously establishing a session at a certain time in the one line of the inter-station line 3 or the communication network 4. The line capacity of one line is set to $B_L$. Also, a call application band used by one call application is set to $B_V$. In this case, the packet discard rate as a whole in one line is expressed by the following formula (1).

[Math. 1]

$$1 - \frac{B_L}{j \cdot B_V} \qquad (1)$$

In order to prevent remarkable deterioration of call quality, a predetermined upper limit value is set for the packet discard rate of each call. This predetermined upper limit value is hereinafter referred to as "first upper limit value $P_B$". The first upper limit value $P_B$ is 50%, for example. The first upper limit value $P_B$ can be said to be a packet discard rate at which the minimum call quality can be obtained. Since the upper limit value of the packet discard rate of each call is the first upper limit value $P_B$, the upper limit value of the packet discard rate as a whole in one line is also the first upper limit value $P_B$. A maximum number of simultaneous calls jmax is the maximum value of the number of simultaneous calls j in which the packet discard rate as a whole in one line is equal to or less than the first upper limit value $P_B$. The maximum number of simultaneous calls jmax is expressed by the following formula (2).

[Math. 2]

$$j\max = \left\lfloor \frac{1}{1-P_B} \frac{B_L}{B_V} \right\rfloor \qquad (2)$$

The right side of the formula (2) is a floor function, and gives a maximum integer equal to or less than an argument. For example, in a case where $B_L/B_V=3.4$ is satisfied, and the first upper limit value $P_B$ is 50%, the maximum number of simultaneous calls jmax is 6.

The call time order k is an order representing the length of the call time. For example, in the following description, the longer the call time is, the higher the call time order k becomes, and the shorter the call time is, the lower the call time order k becomes. The call time order k of the longest call for call time among the j calls (referred to "first call" below) is 1. The call time order k of the shortest call for call time among the j calls (referred to "latest call" below) is equal to the number of simultaneous calls j (k=j).

When the total communication amount of the call application exceeds the line capacity $B_L$, a packet discard rate $D_{j,k}$ is set for each call. The packet discard rate $D_{j,k}$ is set on the basis of the number of simultaneous calls j and the call time order k of each call. More particularly, the packet discard rate $D_{j,k}$ is set to be higher as the call time order k is higher, and the packet discard rate $D_{j,k}$ is set to be lower as the call time order k is lower. When the packet discard rate $D_{j,k}$ is increased and the call quality is deteriorated, it is expected that such a situation encourages a user to end the call. Namely, the longer the call time, the more likely it is that the user ends the call. Ending long calls will free up the line resources and improves the call quality of other users' calls. Another advantage of the congestion control is that the call loss rate will decrease because new calls from users are more likely to be accepted.

Figure 5:
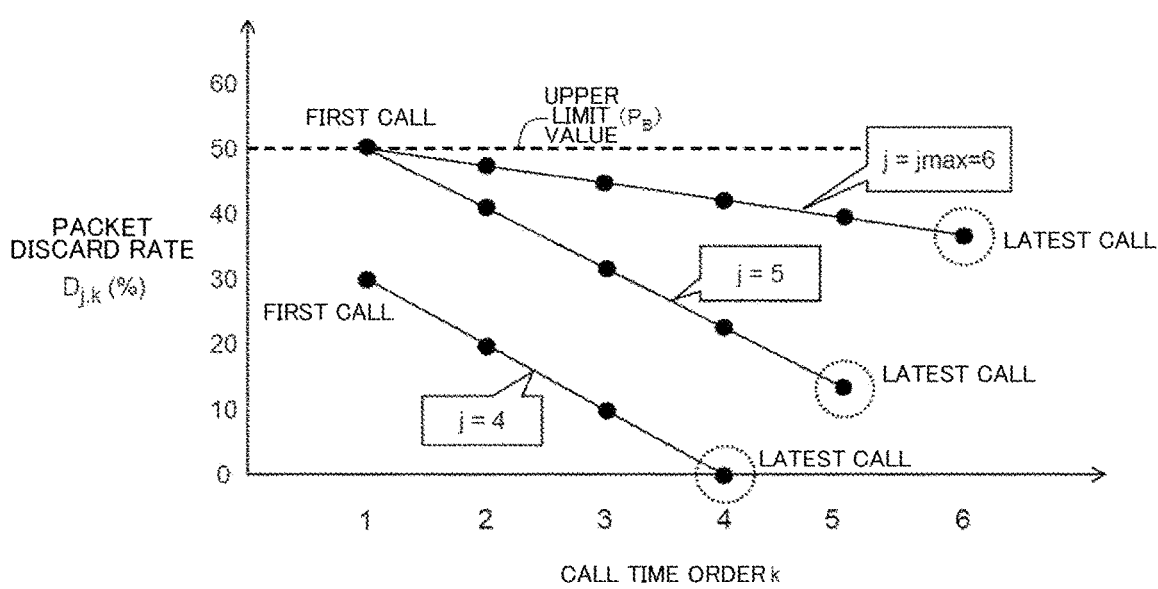
FIG. 5 is a graph showing the relationship between the call time order and the packet discard rate in the case of the comparative example.

FIGS. 4 and 5 show an example of the relationship between the call time rank k and the packet discard rate $D_{j,k}$ in the comparative example. In this example, $B_L/B_V=3.4$, the first upper limit value $P_B=50\%$, and the maximum number of simultaneous calls jmax=6 are satisfied. When the number of simultaneous calls j is 1 to 3, no packet is discarded. When the number of simultaneous calls j is 4 or more, some packets are discarded. As shown in FIGS. 4 and 5, the packet discard rate $D_{j,k}$ is set to be higher as the call time order k is higher, and the packet discard rate $D_{j,k}$ is set to be lower as the call time order k is lower. In particular, as can be seen from FIG. 5, the packet discard rate $D_{j,k}$ is set so as to change linearly with respect to the call time order K. In other words, the packet discard rate $D_{j,k}$ is set so that the relationship between the call time order k and the packet discard rate $D_{j,k}$ is directly proportional to each other. the packet discard rate $D_{j,k}$ in the comparative example is expressed by the following formula group.

<In the Case of Condition A>

A condition A is that the number of simultaneous calls j is expressed by the following formula (3). In the case of condition A, the total communication amount of the call application does not exceed the line capacity $B_L$. Therefore, the packet discard rate $D_{j,k}$ of each packet is 0. In the example shown in FIG. 4, the case of J=1 to 3 corresponds to the case of condition A.

[Math. 3]

$$0 \leq j \leq \frac{B_L}{B_V} \qquad (3)$$

<In the Case of Condition B>

The condition B is that the number of simultaneous calls j is expressed by the following formula (4). In the case of condition B, the packet discard rate $D_{j,k}$, of each call is expressed by the following formula (5). In the case of condition B, the packet discard rate $D_{j,k}$ of the first call (k=1) having the highest call time order k is equal to or less than the first upper limit value $P_B$. Further, as can be seen from the formula (5), the packet discard rate $D_{j,k}$ of the latest call (k=j) having the lowest call time order k is set to 0. In the examples shown in FIGS. 4 and 5, the case of j=4 corresponds to the case of condition B.

[Math. 4]

$$\lfloor B_L/B_V \rfloor < j \leq \left\lfloor \frac{B_L}{B_V} \frac{2}{(2-P_B)} \right\rfloor \qquad (4)$$

[Math. 5]

$$D_{j,k} = \frac{2\left(j - \frac{B_L}{B_V}\right)}{j(j-1)}(j-k) \qquad (5)$$

<In the Case of Condition E>

The condition E is that the number of simultaneous calls j is expressed by the following formula (6). In the case of condition E, the packet discard rate $D_{j,k}$, of each call is expressed by the following formula (7). As can be seen from the formula (7), the packet discard rate $D_{j,k}$ of the first call (k=1) having the highest call time order k is the first upper limit value $P_B$. In the examples shown in FIGS. 4 and 5, the case of j=5 and 6 corresponds to the case of condition E.

[Math. 6]

$$\left\lfloor \frac{B_L}{B_V} \frac{2}{(2-P_B)} \right\rfloor < j < \left\lfloor \frac{1}{1-P_B} \frac{B_L}{B_V} \right\rfloor \qquad (6)$$

[Math. 7]

$$D_{j,k} = \frac{2\left(P_B + \frac{B_L}{j \cdot B_V} - 1\right)}{(j-1)}(j-k) + \left(-P_B - \frac{2B_L}{j \cdot B_V} + 2\right) \qquad (7)$$

Next, a situation in which the number of simultaneous calls j becomes the maximum number of simultaneous calls jmax will be considered. From the above formula (7), it can be seen that the packet discard rate $D_{jmax, jmax}$ of the latest call (k=jmax) having the lowest call time rank k is represented by the following formula (8).

[Math. 8]

$$D_{jmax, jmax} = \left(-P_B - \frac{2B_L}{j\max \cdot B_V} + 2\right) \qquad (8)$$

Figure 6:
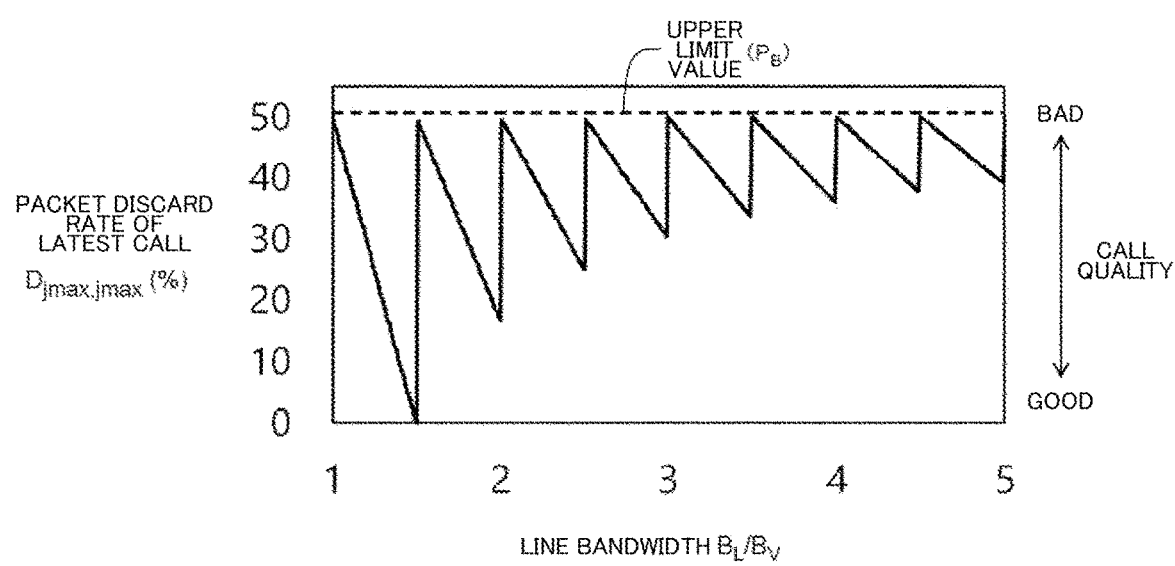
FIG. 6 is a graph showing the relationship between the line bandwidth and the packet discard rate of the latest call in the case of the comparative example.

FIG. 6 is a conceptual diagram showing the relationship between the line bandwidth ($B_L/B_V$) and the packet discard rate $D_{jmax, jmax}$ of the latest call in the case of the maximum number of simultaneous calls jmax. The horizontal axis represents the line bandwidth $B_L/B_V$, and the vertical axis represents the packet discard rate $D_{jmax, jmax}$ of the latest call. For example, when the line bandwidths are 1.6, 2.1, and 2.6, the packet discard rate $D_{jmax, jmax}$ of the latest call are 43.3%, 45%, and 46%, respectively. In other words, the packet discard rate $D_{jmax, jmax}$ of the latest call is also considerably high, and is considerably close to the first upper limit value $P_B$ corresponding to the minimum call quality.

For example, at the time of the disaster, it is imaginable that a large number of users will just want to confirm each other's safety. When the call time is long, there is the high possibility that necessary information has already been transmitted, but when the call time is short, the possibility is low. Therefore, it is desired to ensure the call quality of the call having the short call time, particularly the latest call having the shortest call time as much as possible.

3. Packet Discard Processing

Hereinafter, the packet discard processing by the congestion control device 100 according to the present embodiment will be described in detail. The packet discard control processing according to the present embodiment can suppress the deterioration in the call quality of the latest call which occurs in the case of the above-described comparative example.

3-1. Overview

Figure 7:
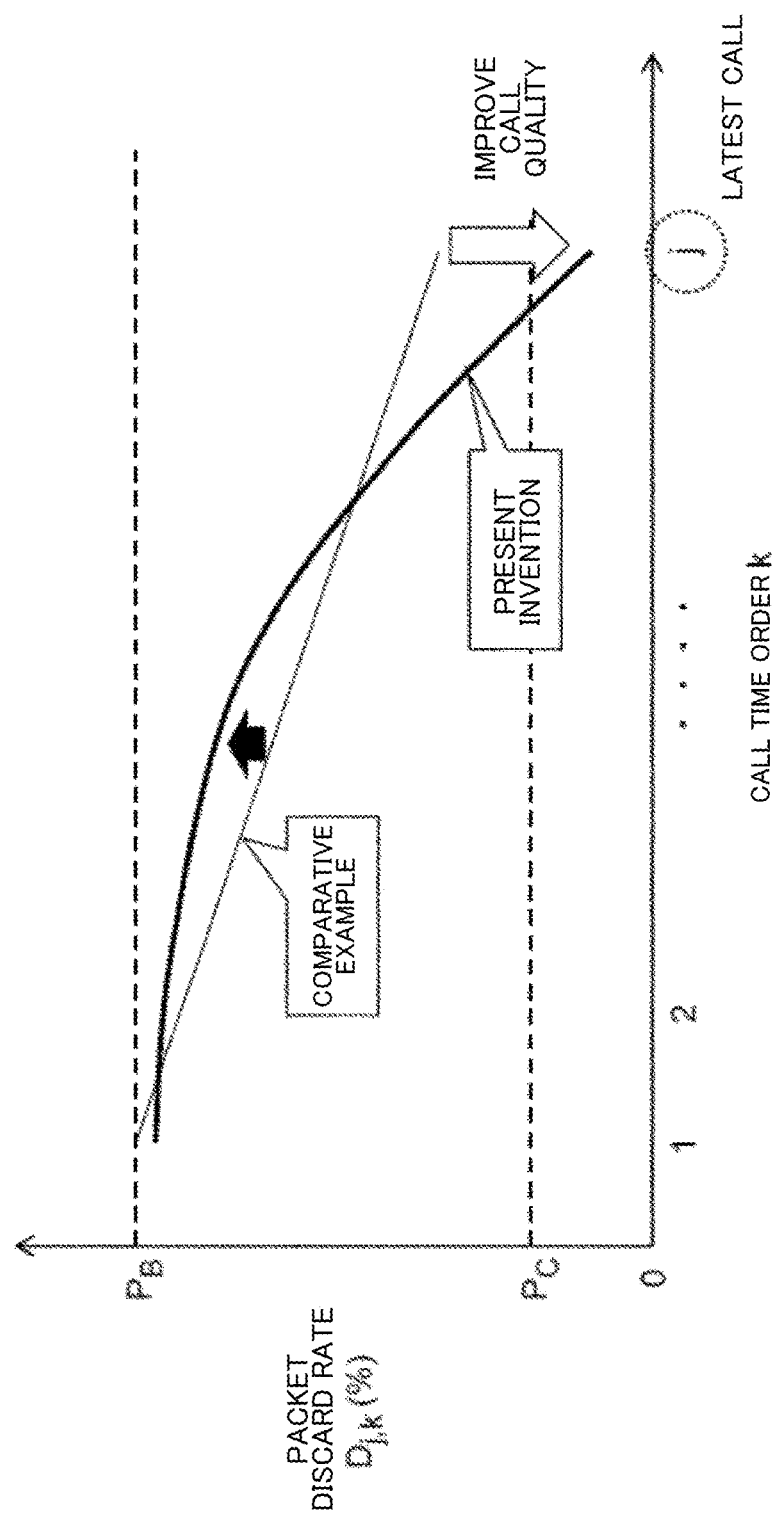
FIG. 7 is a conceptual diagram showing an overview of the packet discard control processing according to the embodiment of the present invention.

FIG. 7 is a conceptual diagram showing an overview of The packet discard control processing according to the present embodiment. FIG. 7 shows the relationship between the call time order k and the packet discard rate $D_{j,k}$ of each call.

Also in the present embodiment, the congestion control device 100 sets (limits) the packet discard rate $D_{j,k}$ of each call to the predetermined first upper limit value $P_B$ or less. More particularly, the congestion control device 100 sets the packet discard rate $D_{j,k}$ to be higher as the call time order k is higher, and the congestion control device 100 sets the packet discard rate $D_{j,k}$ to be lower as the call time order k is lower.

Further, the congestion control device 100 sets the packet discard rate D k of the latest call (k=j) to be lower as compared with the case of the comparative example. Instead, the congestion control device 100 increases the packet discard rate $D_{j,k}$ of the call whose call time order k is middle as compared with the case of the comparative example. As a result, the function of the packet discard rate $D_{j,k}$ with respect to the call time order k is convex upward.

More specifically, according to the present embodiment, in order to suppress the deterioration in the call quality of the latest call, regarding the packet discard rate $D_{j,k}$ of the latest call, an upper limit value different from the first upper limit value $P_B$ is separately set. The predetermined upper limit value for the packet discard rate $D_{j,k}$ of the latest call is hereinafter referred to "second upper limit value $P_C$". The second upper limit value $P_C$ is higher than 0 and lower than the first upper limit value $P_B$. The predetermined second upper limit value $P_C$ is used as a target when the packet discard rate $D_{j,k}$ of the latest call is made lower than that in the case of the comparative example. That is, the congestion control device 100 sets (limits) the packet discard rate $D_{j,k}$ of the latest call to be equal or less than the predetermined second upper limit value $P_C$ lower than the predetermined first upper limit value $P_B$.

Even in a situation where the number of simultaneous calls j becomes the maximum number of simultaneous calls jmax, the packet discard rate $D_{j,k}$ of the latest call is set (limited) to the second upper limit value $P_C$ or less. Therefore, even in a situation where the number of simultaneous calls j becomes the maximum number of simultaneous calls jmax, the deterioration in the call quality of the latest call can be suppressed.

3-2. Example of Packet Discard Rate for Each Condition

Figure 8:
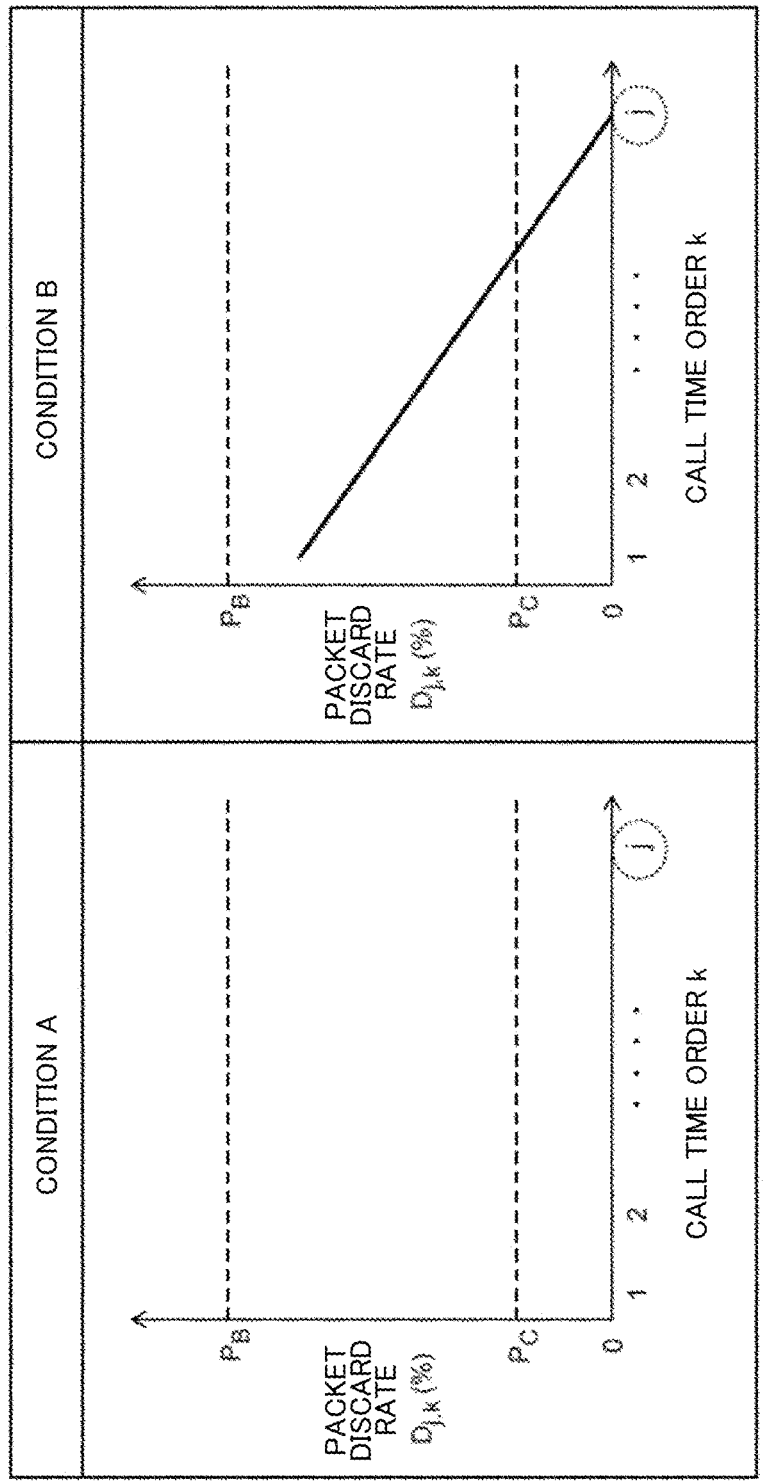
FIG. 8 is a conceptual diagram for describing the packet discard control processing according to the embodiment of the present invention.
Figure 9:
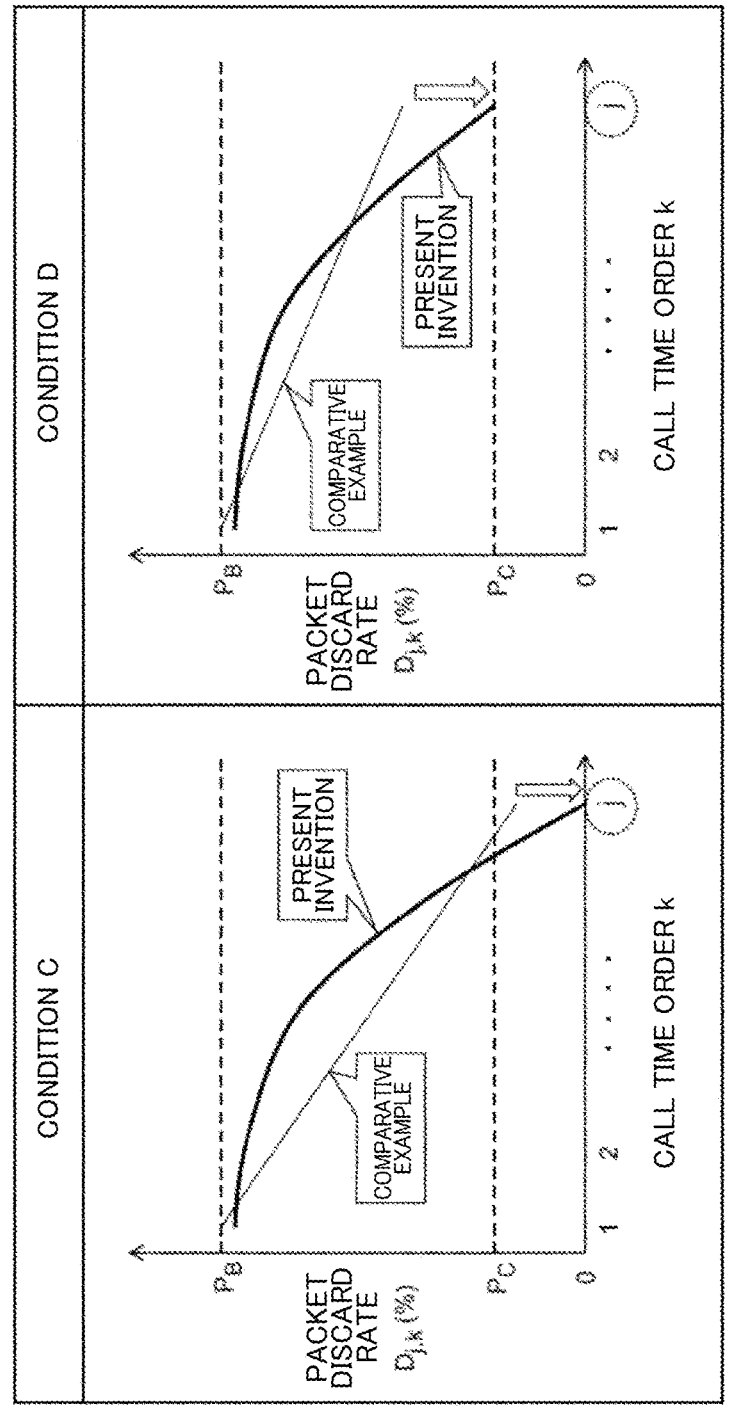

FIGS. 8 and 9 are conceptual diagrams for describing the packet discard control processing according to the present embodiment. More specifically, FIGS. 8 and 9 show examples of setting the packet discard rate $D_{j,k}$ for each condition.

<In the Case of Condition A>

The condition A is that the number of simultaneous calls j is expressed by the above formula (3). In the case of condition A, the total communication amount of the call application does not exceed the line capacity $B_L$. Therefore, the packet discard rate $D_{j,k}$ of each packet is 0. This is the same as in the above-mentioned comparative example.

<In the Case of Condition B>

The condition B is that the number of simultaneous calls j is expressed by the above formula (4). In the case of condition B, the packet discard rate is $D_{j,k}$ of each call is expressed by the above formula (5). In the case of the condition B, the packet discard rate $D_{j,k}$ of the first call (k=1) having the highest call time order k is equal to or less than the first upper limit value $P_B$. Further, as can be seen from the formula (5), the packet discard rate $D_{j,k}$ of the latest call (K=j) is set to 0. As shown in FIG. 8, the packet discard rate $D_{j,k}$ is set so as to change linearly with respect to the call time order K. This is the same as in the above-mentioned comparative example.

<In the Case of Condition C>

The condition C is that the number of simultaneous calls j is expressed by the following formula (9). In the case of condition C, the packet discard rate $D_{j,k}$ of the first call (k=1) by the comparative example reaches the first upper limit value $P_B$, and the packet discard rate $D_{j,k}$ of the latest call (k=j) by the comparative example is higher than 0 and equal to or lower than the second upper limit value $P_C$. In the case of this condition C, the packet discard rate $D_{j,k}$ of each call is expressed by the following formulas (10) and (11).

[Math. 9]

$$\left\lfloor \frac{B_L}{B_V} \frac{2}{(2-P_B)} \right\rfloor < j \leq \left\lfloor \frac{4}{4-3P_B} \frac{B_L}{B_V} \right\rfloor \quad (9)$$

[Math. 10]

$$D_{j,k} = P_B - P_B \cdot \exp(-v(j-k)) \quad (10)$$

[Math. 11]

$$\exp(-v)[1 - \exp\{-(j-1)v\}] =$$
$$\{1 - \exp(-v)\}\left\{\frac{j(P_B - 1) + B_L/B_V}{P_B} - 1\right\} \quad (11)$$

As can be seen from the formula (10), the packet discard rate $D_{j,k}$ of the latest call (k=j) is set to 0. That is, the packet discard rate $D_{j,k}$ of the latest call is lower than that of the comparative example, and is lower than the second upper limit value $P_C$ (refer to FIG. 9). Further, as shown in FIG. 9, the function of the packet discard rate $D_{j,k}$ with respect to the call time order k is convex upward.

<In the Case of Condition D>

The condition D is that the number of simultaneous calls j is expressed by the following formula (12). In the case of condition D, the packet discard rate $D_{j,k}$ of the first call (k=1) of the comparative example reaches the first upper limit value $P_B$, and the packet discard rate $D_{j,k}$ of the latest call (k=j) of the comparative example exceeds the second upper limit value $P_C$. In the case of this condition D, the packet discard rate $D_{j,k}$ of each call is expressed by the following formulas (13) and (14).

[Math. 12]

$$\left\lfloor \frac{4}{4-3P_B} \frac{B_L}{B_V} \right\rfloor < j < \left\lfloor \frac{1}{1-P_B} \frac{B_L}{B_V} \right\rfloor \quad (12)$$

[Math. 13]

$$D_{j,k} = P_B - (P_B - P_C) \cdot \exp(-v'(j-k)) \quad (13)$$

[Math. 14]

$$\exp(-v')[1 - \exp\{-(j-1)v'\}] =$$
$$\{1 - \exp(-v')\}\left\{\frac{j(P_B - 1) + B_L/B_V}{P_C} - 1\right\} \quad (14)$$

As can be seen from the formula (13), the packet discard rate $D_{j,k}$ of the latest call (k=j) is set to the second upper limit value $P_C$. That is, the packet discard rate $D_{j,k}$ of the latest call is lower than that of the comparative example, And is equal to or less than the second upper limit value $P_C$ (refer to FIG. 9). Further, as shown in FIG. 9, the function of the packet discard rate $D_{j,k}$ with respect to the call time order k is convex upward.

In this way, the packet discard rate $D_{j,k}$ of the latest call is set (limited) to be equal to or less than the predetermined second upper limit value $P_C$. Therefore, even in a situation where the number of simultaneous calls j becomes the maximum number of simultaneous calls jmax, the deterioration in the call quality of the latest call can be suppressed.

3-3. Processing Flow

Figure 10:
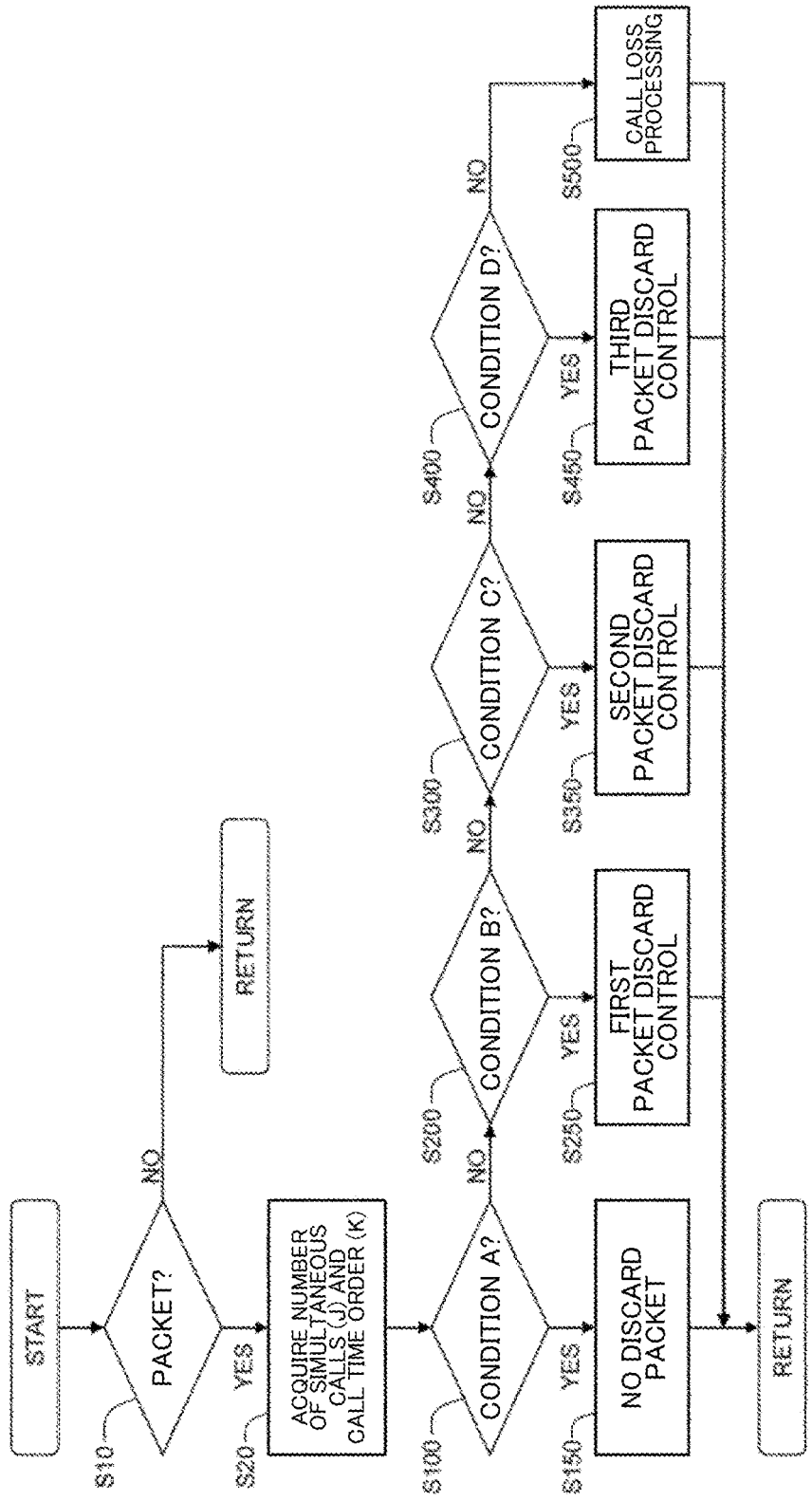
FIG. 10 is a flowchart showing the packet discard control processing according to the embodiment of the present invention.

FIG. 10 is a flowchart showing the packet discard control processing according to the present embodiment.

In a step S10, the congestion control device 100 judges whether or not a packet has arrived. When the packet arrives (Yes; in step S10), the processing proceeds to a step S20.

In a step S20, the congestion control device 100 acquires information on the number of simultaneous calls j and the call time order k of each call.

In a step S100, the congestion control device 100 judges whether or not a condition A (refer to formula (3)) is satisfied. When the condition A is satisfied (Yes; in step S100), the congestion control device 100 does not discard packets (step S150). On the other hand, when the condition A is not satisfied (No; in step S100), the processing proceeds to a step S200.

In a step S200, the congestion control device 100 judges whether or not a condition B (refer to formula (4)) is satisfied. When the condition B is satisfied (Yes; in step S200), the congestion control device 100 performs a first packet discard control (step S250). Specifically, the congestion control device 100 sets the packet discard rate $D_{j,k}$ of each call in accordance with the above formula (5), and performs the packet discard in accordance with the packet discard rate $D_{j,k}$. On the other hand, when the condition B is not satisfied (No; in step S200), the processing proceeds to a step S300.

In a step S300, the congestion control device 100 judges whether or not a condition C (refer to formula (9)) is satisfied. When the condition C is satisfied (Yes; in step S300), the congestion control device 100 performs a second packet discard control (step S350). Specifically, the congestion control device 100 sets the packet discard rate $D_{j,k}$ of each call in accordance with the above formulas (10) and (11), and performs the packet discard in accordance with the packet discard rate $D_{j,k}$. On the other hand, when the condition C is not satisfied (No; in step S300), the processing proceeds to a step S400.

In a step S400, the congestion control device 100 judges whether or not a condition D (refer to formula (12)) is satisfied. When the condition D is satisfied (Yes; in step S400), the congestion control device 100 performs a third packet discard control (step S450). Specifically, the congestion control device 100 sets the packet discard rate $D_{j,k}$ of each call in accordance with the above formulas (13) and (14), and performs the packet discard in accordance with the packet discard rate $D_{j,k}$. On the other hand, when the condition D is not satisfied (No; in step S400), the processing proceeds to a step S500.

The step S500 corresponds to the case where the number of simultaneous calls j exceeds the maximum number of simultaneous calls jmax (refer to formula (2)) by establishing a new call. In this case, the congestion control device 100 executes "call loss processing" for the new call.

Specifically, the congestion control device 100 sets the packet discard rate of the new call to 100%, thereby making the new call substantially a call loss. Thus, the number of simultaneous calls j is limited to the maximum number of simultaneous calls jmax or less.

3-4. Effects

FIG. 11 is a table showing an example of the relationship between the call time rank k and the packet discard rate $D_{j,k}$ according to the present embodiment. In this example, the line capacity $B_L$=340 kbit/s, the call application band $B_V$=100 kbit/s, the first upper limit value $P_B$=50%, the second upper limit value $P_C$=25%, and the maximum number of simultaneous calls jmax=6 are satisfied. When the number of simultaneous calls j is 1 to 3, this corresponds to the case of condition A, and no packet is discarded. When the number of simultaneous calls j is 4, this corresponds to the case of condition B, and the first packet discard control is performed. When the number of simultaneous calls j is 5, this corresponds to the case of condition C, and the second packet discard control is performed. When the number of simultaneous calls j is 6, this corresponds to the case of condition D, and the third packet discard control is performed.

Figure 12:
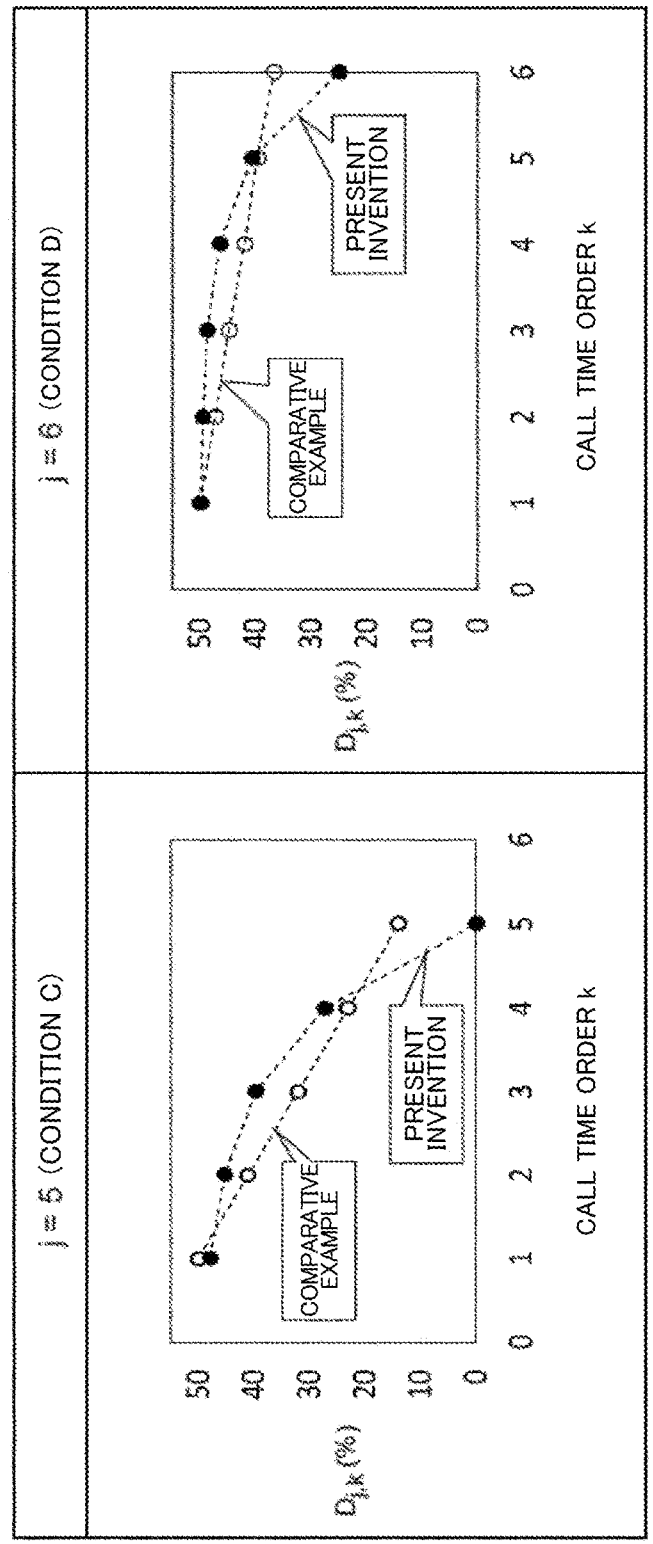
FIG. 12 is a graph showing an example of the relationship between the call time order and the packet discard rate according to the embodiment of the present invention.

FIG. 12 shows the relationship between the call time order k and the packet discard rate $D_{j,k}$ when the number of simultaneous calls j is 5 and 6. FIG. 12 also shows the packet discard rate $D_{j,k}$ in the case of the comparative example shown in already mentioned FIG. 4. A state in which the number of simultaneous calls j is 5 or 6 (the condition C and the condition D) is the state in which the packet discard rate D of the first call (k=1) in the case of the comparative example has reached the first upper limit value $P_B$. As shown in FIG. 12, according to the present embodiment, the packet discard rate $D_{j,k}$ of the latest call (k=j) is lower than that in the case of the comparative example. For example, when the number of simultaneous calls j is 5, the packet discard rate $D_{j,k}$ of the latest call is 0, which is lower than 14% in the case of the comparative example. When the number of simultaneous calls j is the maximum number of simultaneous calls jmax (=6), the packet discard rate $D_{j,k}$ of the latest call is 25% (the second upper limit value $P_C$), and this is lower that 36.7% in the case of the comparative example. Thus, the call quality of the latest speech is improved as compared with the case of the comparative example. Especially, even in a situation where the number of simultaneous calls j becomes the maximum number of simultaneous calls jmax, the deterioration in the call quality of the latest call is suppressed.

Figure 13:
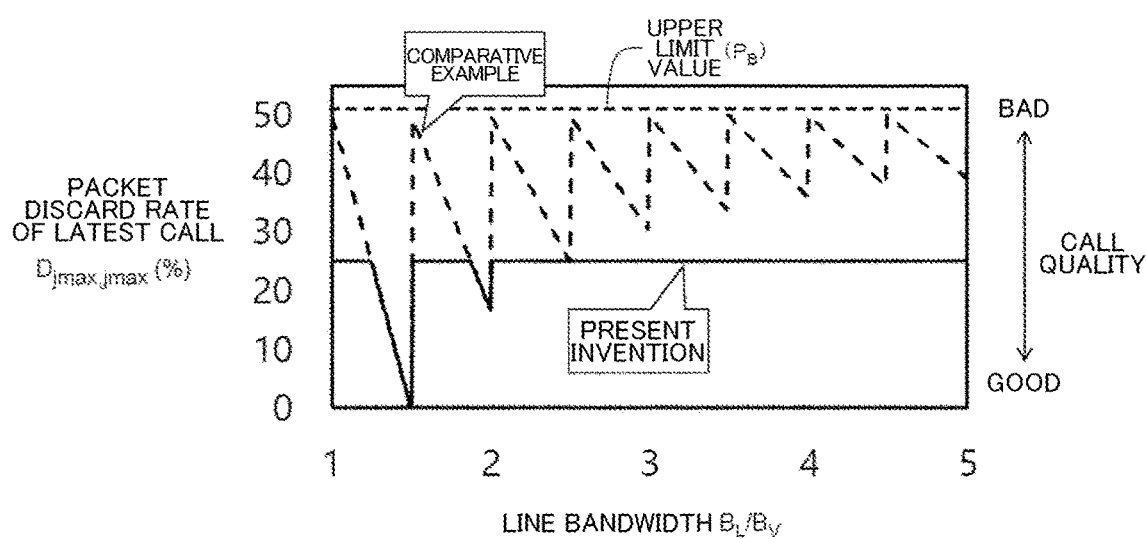
FIG. 13 is a graph showing the relationship between the line bandwidth and the packet discard rate according to the embodiment of the present invention.

FIG. 13 is a conceptual diagram showing the relationship between the line bandwidth ($B_L/B_V$) and the packet discard rate $D_{jmax, jmax}$ of the latest call in the case of the maximum number of simultaneous calls jmax. FIG. 13 also shows the case of the comparative example shown in already mentioned FIG. 6. In the case of the comparative example, there is a situation in which the packet discard rate $D_{jmax, jmax}$ of the latest call is considerably close to the first upper limit value $P_B$. On the other hand, according to the present embodiment, the packet discard rate $D_{jmax, jmax}$ of the latest call is set (limited) to be equal to or less than the second upper limit value $P_C$.

Therefore, even in a situation where the number of simultaneous calls j becomes the maximum number of simultaneous calls jmax, the deterioration in the call quality of the latest call can be suppressed.

For example, at the time of the disaster, it is imaginable that a large number of users will just want to confirm each other's safety. When the call time is long, there is a high possibility that necessary information has already been transmitted, but when the call time is short, the possibility is low. According to the present embodiment, the deterioration of the call quality of the latest call is suppressed so that important information such as safety confirmation can be conveyed favorably. After that, as the call carries on and the call quality lowers, it is expected that the user will end this call. Ending long calls will free up the line resources and improves the call quality of other users' calls. Another advantage of the congestion control is that the call loss rate will decrease because new calls from users are more likely to be accepted.

4. Configuration Example of Congestion Control Device

Figure 14:
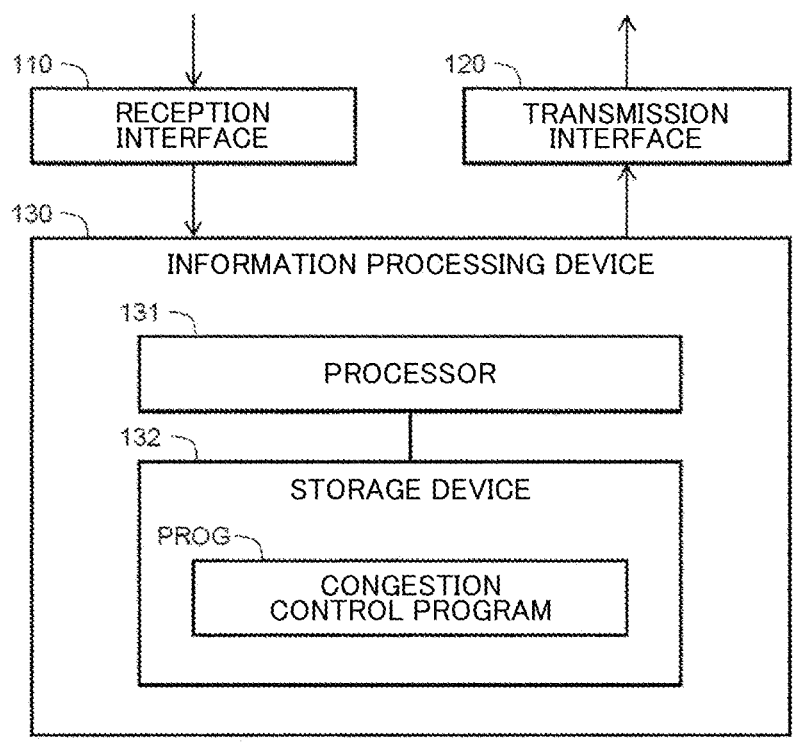
FIG. 14 is a block diagram showing a configuration example of the congestion control device according to the embodiment of the present invention.

FIG. 14 is a block diagram showing a configuration example of the congestion control device 100 according to the present embodiment. The congestion control device 100 includes a reception interface 110, a transmission interface 120, and an information processing device 130. The reception interface 110 receives packets from outside. The transmission interface 120 transmits packets to outside.

The information processing device 130 performs various information processing. For example, the information processing device 130 includes a processor 131 and a storage device 132. The processor 131 performs various information processing. For example, the processor 131 includes a CPU (Central Processing Unit). The storage device 132 stores various kinds of information necessary for processing by the processor 131. As the storage device 132, a volatile memory, a non-volatile memory, an HDD (Hard Disk Drive), an SSD (Solid State Drive), and the like are exemplified.

The congestion control program PROG is a computer program executed by a computer. The processor 131 implements the functions of the information processing device 130 by executing the congestion control program PROG. The congestion control program PROG is stored in the storage device 132. The congestion control program PROG may be recorded in a computer-readable recording medium. The congestion control program PROG may be provided via a network.

The information processing device 130 may be implemented using hardware such as an ASIC (Application Specific Integrated Circuit), PLD (Programmable Logic Device), FPGA (Field Programmable Gate Array), and so on.

Figure 15:
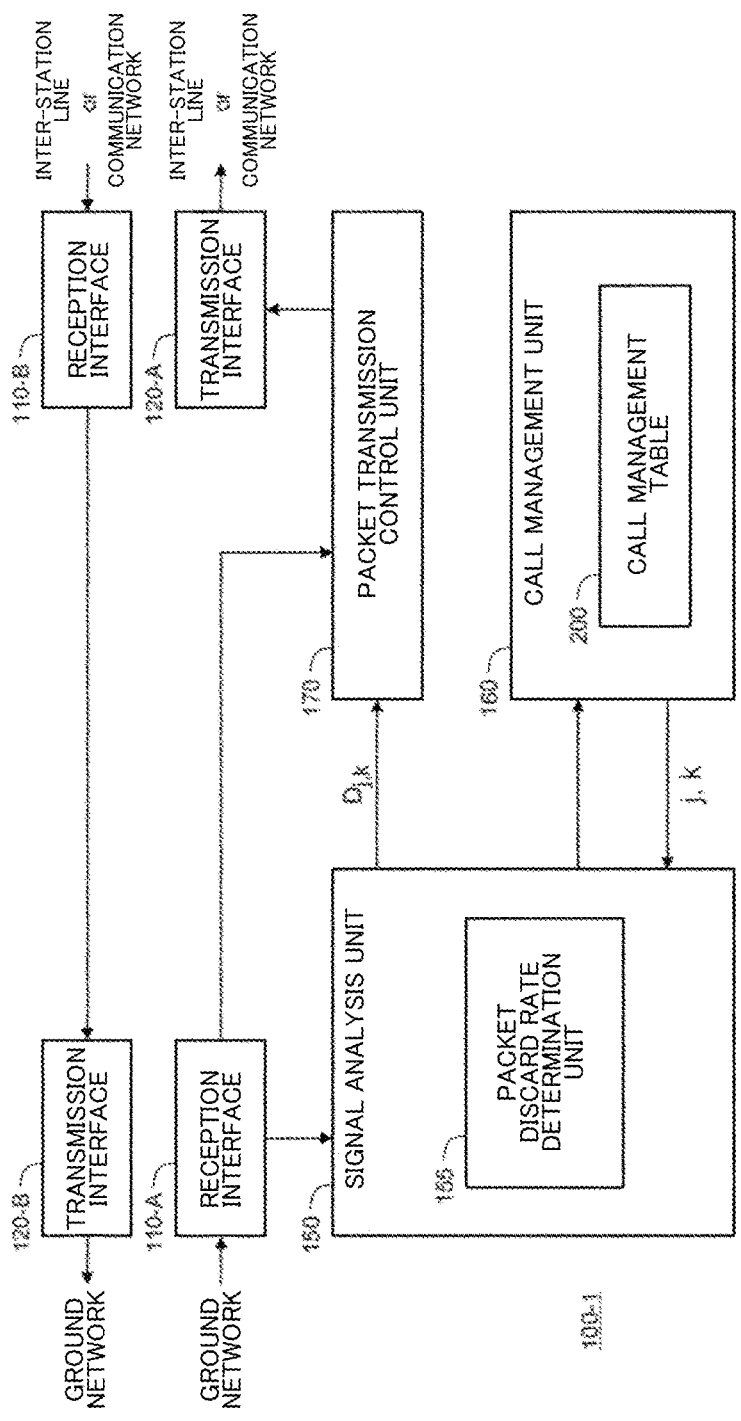
FIG. 15 is a block diagram showing a functional configuration example of the congestion control device in a base station side according to the embodiment of the present invention.

FIG. 15 is a block diagram showing a functional configuration example of the congestion control device 100-1 in the base station 10 side. The congestion control device 100-1 includes a reception interface 110-A, a transmission interface 120-A, a reception interface 110-B, and a transmission interface 120-B. The reception interface 110-A receives packets from the ground network 2. The transmission interface 120-A transmits packets to the inter-station line 3 or communication network 4. The reception interface 110-B receives packets from an inter-station line 3 or communication network 4. The transmission interface 120-B transmits packets to the ground network 2.

The congestion control device 100-1 further includes a signal analysis unit 150, a call management unit 160, and a packet transmission control unit 170. These of the signal analysis unit 150, the call management unit 160, and the packet transmission control unit 170 are implemented by the information processing device 130.

The signal analysis unit 150 receives a reception packet from the reception interface 110-A. The signal analysis unit 150 analyzes the reception packet and acquires information on the reception packet. Specifically, the signal analysis unit 150 acquires a transmission source address, a transmission source port number, a destination address, and a destination port number of the reception packet. The signal analysis unit 150 judges whether the reception packet is for a call start, a call end, or others. The signal analysis unit 150 informs the call management unit 160 of analysis results information indicating the transmission source address, the transmission source port number, the destination address, the destination port number, and the classification (the call start, the call end, others).

The call management unit 160 manages each of the calls handled by the congestion control device 100. Each call is defined by a combination of the source address, the source port number, the destination address, and the destination port number. The call management unit 160 receives the analysis results information from the signal analysis unit 150, and generates and updates the call management table 200 based on the analysis results information.

FIG. 16 is a conceptual diagram showing an example of the call management table 200. The call management table 200 has entries for respective call. Each entry includes a call ID, the source address, the source port number, the destination address, the destination port number, and a call start time.

When the classification of the reception packet is "the start call", the call management unit 160 creates an entry for a new call. The combination of the source address, the source port number, the destination address, and the destination port number for the new call is obtained from the analysis results information. The call management unit 160 assigns the call ID to the new call session. Further, the call management unit 160 sets the current time to the call start time of the new call.

When the classification of the reception packet is "the call end", the call management unit 160 deletes the entry for this call.

When receiving the reception packet, the signal analysis unit 150 inquires the number of simultaneous calls j and the call time order k of each call of the call management unit 160. The call management unit 160 refers to the call management table 200 and acquires the number of simultaneous calls j and the call time order k. At this time, the call time can be calculated from the current time and the call start time. As the call time becomes longer, the call time order k becomes higher. The call management unit 160 notifies the signal analysis unit 150 of the number of simultaneous calls j and the call time order k of each call.

A packet discard rate determination unit 155 of the signal analysis unit 150 determines the packet discard rate $D_{j,k}$ of each call on the basis of the number of simultaneous calls j and the call time order k of each call. Then, the signal analysis unit 150 notifies the packet transmission control unit 170 of the packet discard rates $D_{j,k}$ of each call.

In the case of executing the call loss processing, the packet discard rate determination unit 155 sets the packet discard rate of the new call to 100%. The signal analysis unit 150 then notifies the call management unit 160 of the call loss processing execution to the new call. The call management unit 160 deletes the entries for the new call from the call management table 200.

The packet transmission control unit 170 receives the reception packets from the reception interface 110-A. The packet transmission control unit 170 discards packets as required in accordance with the discard rate $D_{j,k}$ notified from the signal analysis unit 150. The packet transmission control unit 170 then transmits the packets that were not discarded via the transmission interface 120-A.

Figure 17:
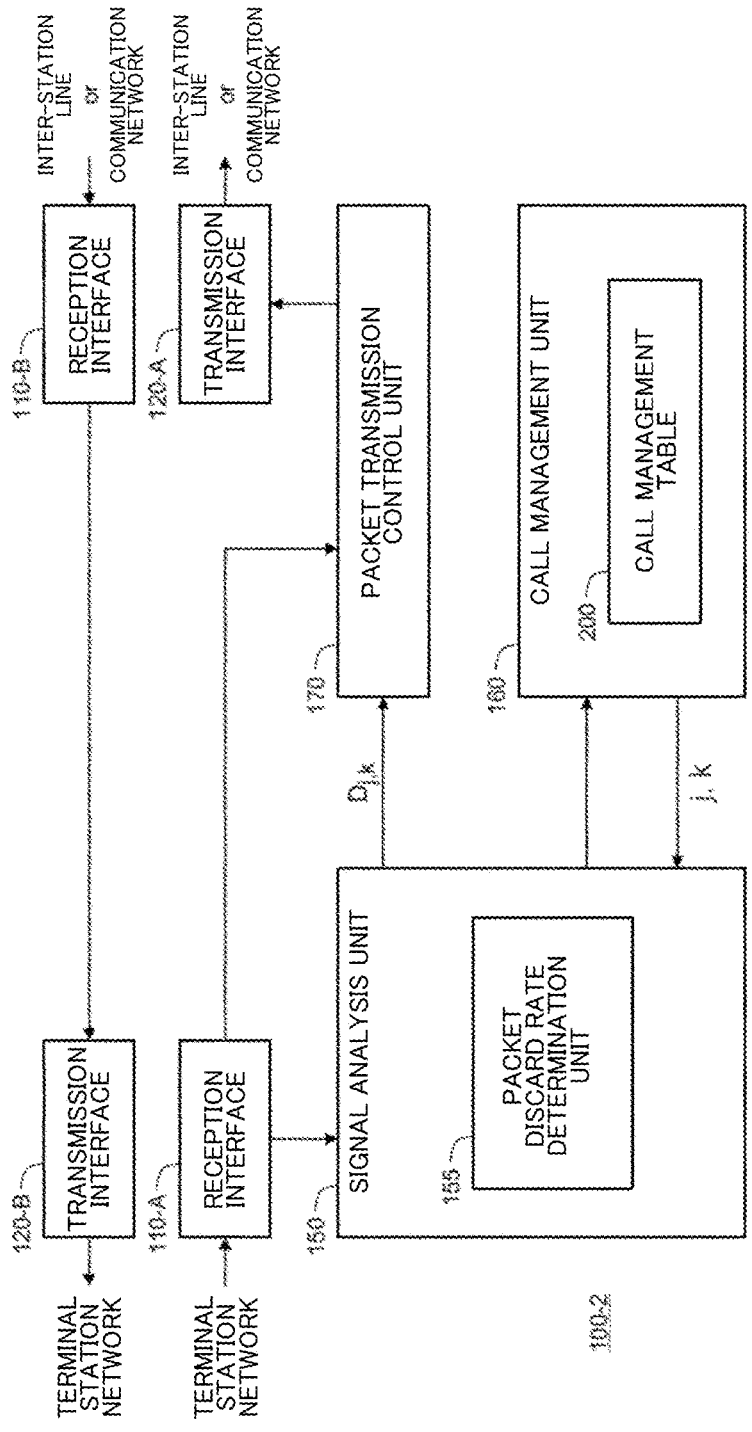
FIG. 17 is a block diagram showing a functional configuration example of the congestion control device in a terminal station side according to the embodiment of the present invention.

FIG. 17 is a block diagram showing a functional configuration example of the congestion control device 100-2 in the terminal station 20. The congestion control device 100-2 has the same configuration as that of the congestion control device 100-1 shown in FIG. 15. However, the difference is that the reception interface 110-A receives packets from the terminal station network 5 while the transmission interface 120-B transmits packets to the terminal station network 5. The functions of the signal analysis unit 150, the call management unit 160, and the packet transmission control unit 170 are similar to those of the congestion control device 100-1 shown in FIG. 15.

REFERENCE SIGNS LIST

1 IP telephone system
2 Ground network
3 Inter-station line
4 Communication network
5 Terminal station network
10 Base station
20 Terminal station
100 Congestion control device
110 Reception interface
120 Transmission interface
130 Information processing device
131 Processor
132 Storage device
150 Signal analysis unit
155 Packet discard rate determination unit
160 Call management unit
170 Packet transmission control unit
200 Call management table
PROG Congestion control program

The invention claimed is:

1. A congestion control method in an Internet Protocol (IP) telephone system, comprising:
acquiring a number of simultaneous calls in a first line shared by a plurality of IP telephones;
acquiring a call time order corresponding to a length of a call time for each call; and
controlling a packet discard rate of each call based on the number of simultaneous calls and the call time order,
wherein controlling the packet discard rate includes:
setting the packet discard rate of each call to be equal to or less than a predetermined first upper limit value,
setting the packet discard rate (i) higher for longer call times and (ii) lower for shorter call times, and
setting the packet discard rate of a latest call having the shortest call time to be equal to or less than a predetermined second upper limit value lower than the predetermined first upper limit value, and
wherein:
in a comparison method, the packet discard rate of each call is set to be equal to or less than the predetermined first upper limit value, the packet discard rate is set higher for longer call times, the packet discard rate is set lower for shorter call times, further the packet discard rate is set so that the packet discard rate linearly changes with respect to the call time order,
a first call has a longest call time,
a first state is a state in which the packet discard rate of the first call in the case of the comparison method reaches the predetermined first upper limit value, and
in the first state, the packet discard rate of the latest call is set to be lower than that of the comparison method.

2. The congestion control method according to claim 1, wherein, in the first state, a function of the packet discard rate with respect to the call time order is convex upward.

3. The congestion control method according to claim 1, wherein controlling the packet discard rate includes, in the first state, based on the packet discard rate of the latest call by the comparison method being greater than 0 and equal to or less than the predetermined second upper limit value, setting the packet discard rate of the latest call to 0.

4. The congestion control method according to claim 1, wherein controlling the packet discard rate includes, in the first state, based on the packet discard rate of the latest call by the comparison method exceeding the predetermined second upper limit value, setting the packet discard rate of the latest call to the predetermined second upper limit value.

5. The congestion control method according to claim 1, further comprising: based on establishment of a new call causing the number of simultaneous calls to exceed the maximum number of simultaneous calls, setting the packet discard rate to 100%.

6. A non-transitory computer recording medium storing a congestion control program, wherein execution of the congestion control program causes one or more computers to perform operations comprising:
acquiring a number of simultaneous calls in a first line shared by a plurality of Internet Protocol (IP) telephones;
acquiring a call time order corresponding to a length of call time for each call; and
controlling a packet discard rate of each call based on the number of simultaneous calls and the call time order,
wherein controlling the packet discard rate includes:
setting the packet discard rate of each call to be equal to or less than a predetermined first upper limit value,
setting the packet discard rate (i) higher for longer call times and (ii) lower for shorter call times, and
setting the packet discard rate of a latest call having the shortest call time to be equal to or less than a predetermined second upper limit value lower than the predetermined first upper limit value, and
wherein:
in a comparison method, the packet discard rate of each call is set to be equal to or less than the predetermined first upper limit value, the packet discard rate is set higher for longer call times, the packet discard rate is set lower for shorter call times, further the packet discard rate is set so that the packet discard rate linearly changes with respect to the call time order,
a first call has a longest call time,
a first state is a state in which the packet discard rate of the first call in the case of the comparison method reaches the predetermined first upper limit value, and
in the first state, the packet discard rate of the latest call is set to be lower than that of the comparison method.

7. A congestion control device in an Internet Protocol (IP) telephone system, comprising:
an information processing device, implemented using one or more computing devices, configured to perform operations comprising: acquiring a number of simultaneous calls in a first line shared by a plurality of IP telephones,
acquiring a call time order corresponding to a length of call time for each call, and
controlling a packet discard rate of each call based on the number of simultaneous calls and the call time order, wherein the information processing device is configured to: set the packet discard rate of each call to be equal to or less than a predetermined first upper limit value,
set the packet discard rate (i) higher for longer call times and (ii) lower for shorter call times, and
set the packet discard rate of a latest call having the shortest call time to be equal to or less than a predetermined second upper limit value lower than the predetermined first upper limit value, and wherein:
in a comparison method, the packet discard rate of each call is set to be equal to or less than the predetermined first upper limit value, the packet discard rate is set higher for longer call times, the packet discard rate is set lower for shorter call times, further the packet discard rate is set so that the packet discard rate linearly changes with respect to the call time order,
a first call has a longest call time,
a first state is a state in which the packet discard rate of the first call in the case of the comparison method reaches the predetermined first upper limit value, and
in the first state, the packet discard rate of the latest call is set to be lower than that of the comparison method.

* * * * *